June 26, 1945.  E. E. MEUSY  2,379,096
TURRET LATHE
Filed Aug. 3, 1940   3 Sheets-Sheet 1

Inventor
Eugene E. Meusy

June 26, 1945.   E. E. MEUSY   2,379,096
TURRET LATHE
Filed Aug. 3, 1940   3 Sheets-Sheet 2

Inventor
Eugene E. Meusy
By Whitton Jones
Attorney

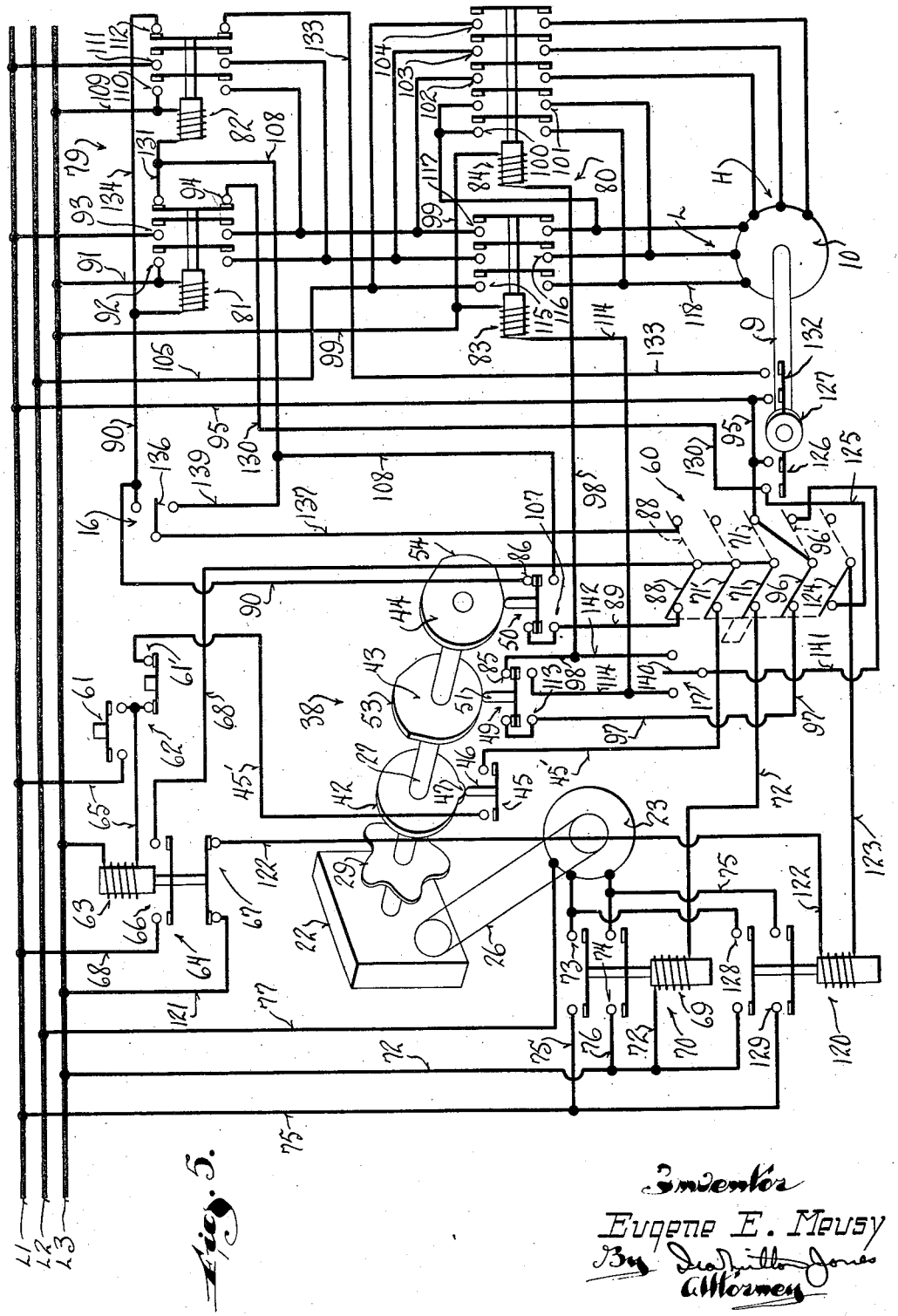

Patented June 26, 1945

2,379,096

UNITED STATES PATENT OFFICE 2,379,096

TURRET LATHE

Eugene E. Meusy, Milwaukee, Wis., assignor to Milwaukee Gas Specialty Company, Milwaukee, Wis., a corporation of Wisconsin Application August 3, 1940, Serial No. 350,559

28 Claims. (Cl. 29—44)

This invention relates to lathes, and refers particularly to lathes of the turret type.

Lathes of this character employ a turret adapted to hold a plurality of different machining tools which is mounted for reciprocation toward a motor-driven work-carrying spindle on the lathe to carry its tools into engagement with the work; and for rotation between its various tool stations upon reciprocation away from the work to its indexing position to enable various machining operations to be performed in sequence during its reciprocatory movement toward the work.

Operation of a lathe of this type has invariably been effected manually by an operator actuating suitable levers or the like arranged to carry the turret toward the work for a machining operation, and from the work to an indexing position. This, obviously, required the services of one operator for each machine operating at any given time.

In this type of lathe it is also customary for the operator to furnish the power for forcing the machining tools carried by the turret into the work. Consequently, a degree of skill on the part of the operator was required. The sustained physical effort expended during operation of a lathe of the character described for long periods of time also limited the field from which operators could be drawn.

With these objections in mind, one of the objects of the present invention resides in providing a turret lathe of the character described with power-driven means for reciprocating the turret between its operating and indexing positions.

More specifically, this invention has as one of its objects the provision of power-driven means for reciprocating the turret of a lathe of the character described which is designed to carry the turret through its complete cycle of machining operations, and which is automatically rendered ineffective upon completion of the machining cycle.

A further object of this invention resides in providing semi-automatic operation of a normally manually operated turret lathe which requires the attention of an operator only for inserting and removing work from the spindle of the lathe and for initiating operation of the power-driven means for driving the turret.

Such operation is highly desirable inasmuch as it enables one operator to attend a plurality of lathes so equipped and obviously reduces the cost of labor while multiplying the output of the operator.

The semi-automatic control of this invention is further advantageous in that it enables operation of a lathe of the character described by an unskilled worker, and of either sex, inasmuch as little or no effort or skill is required for the loading and unloading operations.

Another object of the present invention resides in the provision of a lathe of the character described which may be either manually operated in the customary manner, or operated in a semi-automatic manner by electrically controlled power-driven means, such manual or semi-automatic operation of the lathe being controlled by a single selector switch to render either one or the other type of operation ineffective.

A further object of this invention resides in providing a lathe of the character described with power-driven means for reciprocating the turret thereof, and with electrical control instrumentalities for automatically governing the operation of the spindle motor as well as the power-driven means for reciprocating the turret.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 5 is a wiring diagram illustrating the manner in which the operation of the lathe is electrically controlled.

Figure 1:
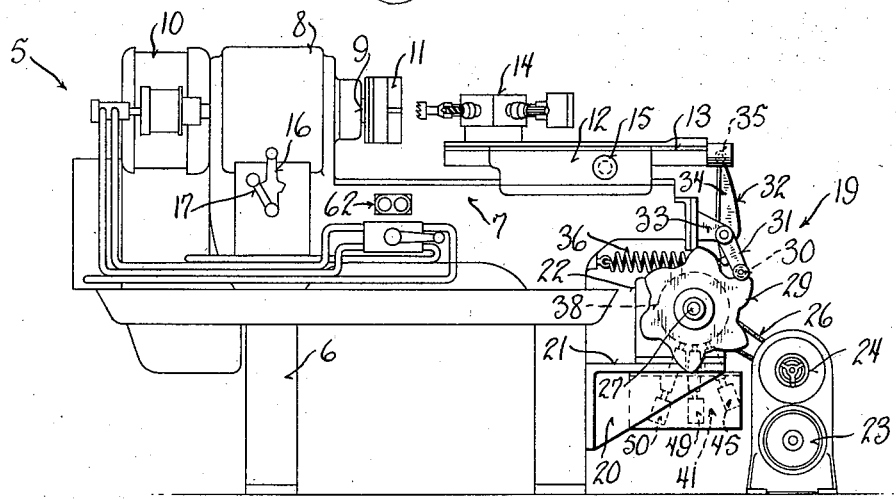
Figure 1 is an elevational view of a normally manually operated turret lathe illustrating the application of this invention thereto.
Figure 2:
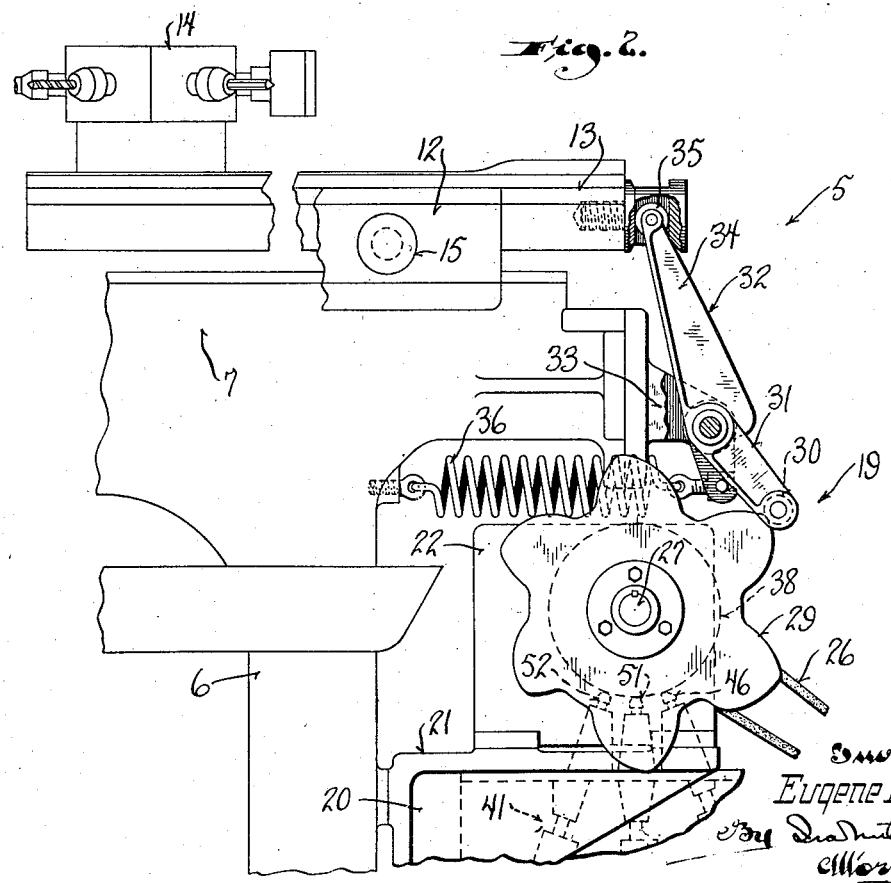
Figure 2 is an enlarged view of a portion of the lathe shown in Figure 1 more clearly illustrating the application of this invention thereto.
Figure 3:
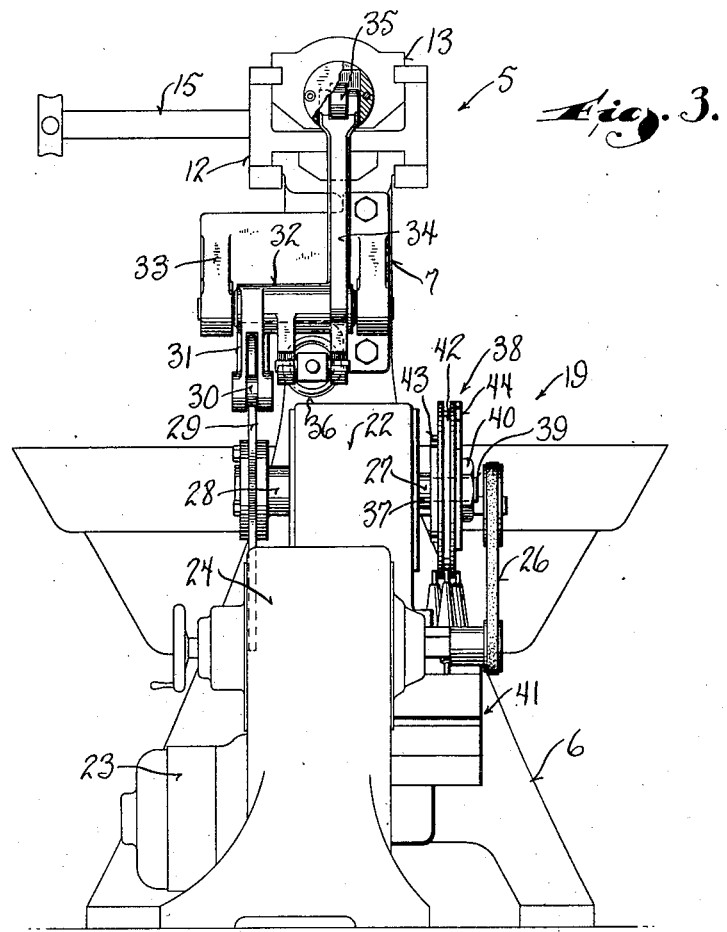
Figure 3 is an enlarged end view of the lathe illustrated in Figure 1.
Figure 4:
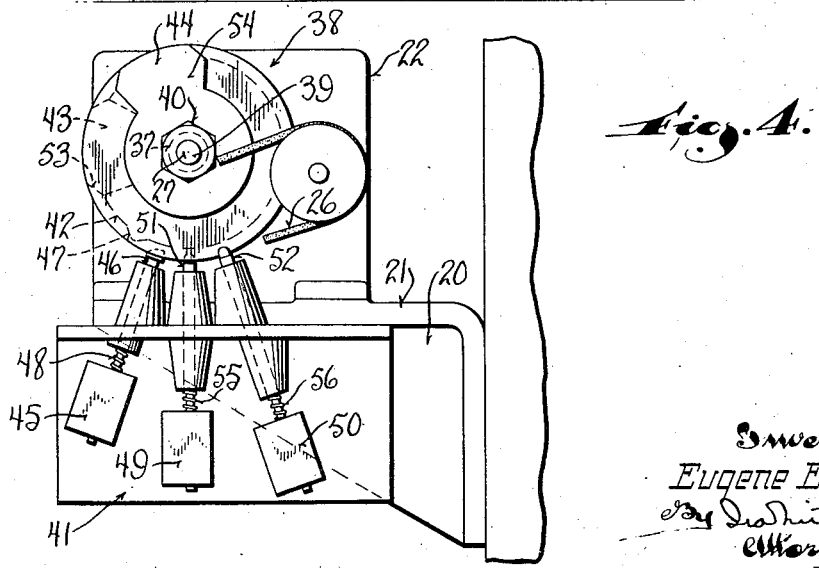
Figure 4 is a detail view in elevation of a portion of the control means.

Referring now more particularly to the accompanying drawings, the numeral 5 designates a normally manually operated turret lathe. As is customary, the lathe includes a rigid supporting framework 6 for supporting the bed 7 of the lathe at an elevation above the floor.

At one end of the bed the lathe is provided with a head 8 which mounts a spindle 9 for rotation on a horizontal axis extending longitudinally of the lathe. One end of the spindle is drivingly connected with a reversible multi-speed electric spindle motor 10 and its opposite end adjacent to the medial portion of the bed is provided with a pressure operated chuck 11 in which work is adapted to be clamped for rotation with the spindle.

At the end of the bed opposite the spindle is a saddle 12 which projects above the bed to mount a turret slide 13 for reciprocation toward and from the chuck on the spindle. A turret 14 is carried by the turret slide at its end adjacent to the chuck and is provided with the customary means, not shown, for indexing the same during reciprocation of the turret slide in one direction.

For this purpose the turret is mounted for rotation on a vertical axis fixed with respect to the turret slide and so that the indexing means operates to rotate the turret a degree corresponding to the arcuate distance between any two of its adjacent tools during reciprocation of the turret and its slide in a direction away from the chuck of the spindle to its indexing position. Reciprocatory movement of the turret toward the spindle carries the tool of the turret aligned with the work carried by the spindle into the work for the performance of one of its machining operations.

For regular manual operation of the turret lathe a hand lever, not shown, is provided to rotate a pinion shaft 15 for effecting reciprocation of the turret slide as by the engagement of a pinion on the shaft with the teeth of a rack, not shown, carried by the turret slide.

The manual operation of the spindle motor 10 is controlled by a pair of levers 16 and 17 mounted at the side of the bed beneath the head 8 of the lathe. The levers 16 and 17 actuate switches which control the connection of the spindle motor with a source of current. In the present instance, the lever 16 operates to govern starting and stopping of the spindle motor as well as the direction of rotation thereof, so that the same may be reversed for opposite rotation during such machining operations as tapping.

The lever 17 controls the speed of the motor which, as stated, is of the multi-speed type and enables changing the speed of the spindle as required for certain machining operations.

The manner in which the levers 16 and 17 operate to control the spindle motor is more fully illustrated in the wiring diagram Figure 5, and will be later described.

Inasmuch as this invention contemplates the provision of a semi-automatic control which operates to automatically drive the turret through its complete cycle of machining operations after work has been manually inserted into the jaws of the chuck 11 without material change in the construction of a conventional normally manually operated lathe, the power-driven means 19 for actuating the turret slide is preferably of unitary construction.

For this purpose the control mechanism comprises a bracket 20 securable in any suitable manner to the supporting frame 6 of the lathe so as to provide a substantially horizontal flange 21 positioned beneath the outer end of the turret slide 13.

A speed reducer 22 is carried on the flange or ledge 21 to be drivingly connected with an electric motor 23 through a variable speed drive 24 connecting with the speed reducer by means of a belt 26.

The speed reducer carries a drive shaft 27 in a position extending transversely of the machine and with its axis substantially parallel to the flange 21 and spaced thereabove. The shaft 27 projects from the operator's side of the machine as at 28 and has fixed thereto a cam 29, which may be termed a job cam.

The job cam 29 is formed to transmit reciprocatory movement to the turret slide 13 upon rotation of the cam. If the turret is designed to carry six tools as illustrated in the drawings, the cam must be designed to propel and retract the turret slide six times during one complete revolution of the cam to effect indexing of the turret to each of its tool stations and to carry the turret through its complete machining cycle. Obviously if the turret has a different number of tool stations the job cam would have to be designed to effect a like number of reciprocations of the turret. In any event, the cam must effect reciprocation of the turret a number of times corresponding to the number of tool stations of the turret.

Accordingly, in this instance where there are six tool stations on the turret, the periphery of the timing cam is provided with six highs and six lows.

Rotation of the cam is translated into reciprocation of the turret by a lever 32. This lever is mounted for oscillation in a substantially upright plane by means of a bracket 33 secured to the end of the bed beneath the turret slide. A depending arm 31 of the lever carries a roller or cam follower 30 which tracks on the cam and an upwardly projecting arm 34 on the lever is connected as at 35 with the turret slide.

The roller or cam follower 30 is maintained in engagement with the periphery of the cam by means of a heavy tension spring 36 secured between the arm 31 of the lever and the adjacent portion of the bed. The tension spring 36, as will be apparent, has sufficient strength to retract the turret slide to its indexing position after it has been propelled toward the work in the chuck by means of the cam.

If desired the cam may be of the box type to positively propel and retract the turret slide, and in this instance no spring is necessary.

The opposite end of the shaft 27 projects from the speed reducer as at 37 and has fixed thereon a timing cam assembly 38. The cam structure 38 is mounted on a reduced end portion 39 of the shaft and is maintained against the shoulder formed between the portions 37 and 39 of the shaft by means of a nut 40 threaded on the reduced end portion 39.

Cooperating with the timing cam assembly 38 are a plurality of limit switches 41 equal in number to the number of timing cams.

In the present instance three timing cams have been shown, a center or cycle cam 42 and spindle motor controlling cams 43 and 44 respectively at each side of the cycle cam. The limit switch 45 has an actuator 46 maintained in the path of a projection 47 on the periphery of the cycle cam 42 by means of a compression spring 48 while the remaining limit switches 49 and 50 each have actuators 51 and 52 maintained in the paths of projections 53 and 54 on the spindle motor cams 43 and 44 respectively by compression springs 55 and 56 respectively.

The cams 43 and 44 are circumferentially adjustable with respect to the cycle cam 42 by means of the nut 40 for a purpose to be later described.

The cycle cam 42 cooperates with the switch 45 and the job cam 29 to automatically stop the operation of the spindle motor 10 and the cam motor 23 upon completion of one machining cycle of the turret. The manner in which the limit switches cooperate with the cams of the timing cam structure 38 is clearly illustrated in the wiring diagram of Figure 5, and the switches operate to control the spindle motor and cam motor only when the machine is operated as a semi-automatic lathe.

For the purpose of selectively operating the lathe, a manually operated selector switch 60 is provided. With the position of switch 60 as illustrated in Figure 5, the lathe is set for semi-automatic operation. Obviously, the manual control switches 16 and 17 for forward and reverse operation and high-low operation of the spindle motor respectively, must be maintained in open position with this setting of the switch 60.

Each of the motors 10 and 23 is started upon depression of the normally open contactor 61 of a start-stop switch 62.

Depression of the contactor 61 when the selector switch 60 is set for semi-automatic operation completes a circuit from power line L1 through a conductor 65 and the contactor 61 to the coil 63 of a master relay 64, and through the coil to power line L3. The master relay has one set of normally open contacts 66 which close upon energization of its coil 63 and a set of normally closed contacts 67 which open upon energization of its coil. Upon such closure of the contacts 66, line L1 is connected through a conductor 68 and a contactor 71 of the selector switch 60 with a conductor 72 which leads to the power line L3 through the coil 69 of a cam motor starter switch 70.

The energizing circuit for the coil of the starter switch 70 just completed effects closure of two sets of normally open contacts 73 and 74 of the starter switch. The closed contacts 73 connect the power line L1 with the cam motor through a conductor 75, and the closed contacts 74 connect the power line L3 with the cam motor through conductors 72 and 76. The power line L2 is permanently connected with the cam motor through a conductor 77.

Hence, energization of the coil of the starter switch 70 places the cam motor in operation to effect reciprocation of the turret as described.

Inasmuch as the limit switch 45 is always open at the start of a cycle of operation as illustrated in the diagram, it is necessary to hold the contactor 61 of the start button depressed until rotation of the cam motor carries the projection 47 on the cycle cam 42 away from the actuator of the limit switch 45 and allows the limit switch to close.

As soon as the limit switch 45 has been closed in this manner, the start button 61 may be released, as the energizing circuit for the coil 63 of the master relay 64 is maintained from power line L3 and the conductor 65 through the coil 63 and normally closed contactor 61' of the start-stop switch 62 on to a conductor 45' and through the now closed limit switch 45 and a contactor 71' of the selector switch 60 onto the conductor 68 and to the power line L1 through the closed contacts 66 of the master relay. The cam motor is now operating automatically.

Simultaneously with closure of the start switch 61, however, an energizing circuit is completed to the spindle motor. Inasmuch as the spindle motor 10 is a reversible multi-speed type motor, the circuit for its energization includes a forward-reverse switch 79 and a high and low speed switch 80. The forward-reverse switch 79 includes a forward electromagnetic switch 81 and a reverse electromagnetic switch 82, while the high and low speed switch 80 includes a low speed electromagnetic switch 83 and a high speed electromagnetic switch 84.

The electromagnetic switches 81 and 82 are controlled by the operation of the cam 44 and its associated two position limit switch 50 while the switches 83 and 84 of the high and low speed switch 80 are controlled by the cam 43 and its associated two position limit switch 49. Hence, the circumferential positions of adjustment of the cams 43 and 44 determine when the spindle motor is to be reversed, or its speed reduced or increased in either position of rotation.

Assuming that the turret has a tapping operation to perform on the work carried by the spindle chuck, it is seen that it is necessary to reverse the spindle motor to effect retraction of the turret without injuring the threads cut into the work. For this purpose the cam 44 is adjusted to a circumferential position such as to effect reversal of the spindle motor at the completion of the tapping operation and to permit the motor to again run in a forward direction after the tool has been expelled from the work. Obviously, the job cam must be formed to permit such forcible retraction of the turret in consequence to reverse rotation of the spindle after completion of the threading operation.

Inasmuch as certain tools require either a high or a low speed for the spindle motor, the position of the cam 43 must be adjusted circumferentially in accordance with the sequence of such operations to either reduce or increase the speed of the spindle motor.

As illustrated in the diagram, each of the limit switches 49 and 50 has its actuator in its upwardly projected position closing sets of contacts 85 and 86 respectively by reason of the circumferential positions of the cams 43 and 44 at the start of the cycle of operation. When these contacts are closed, the spindle motor will be connected for high speed forward operation.

Hence, upon depression of the start button 61 and establishment of the holding circuit for the coil of the master relay, an energizing circuit for the coil of the forward switch 81 is completed from line L1 through the conductor 68 and the closed contacts 66 of the master relay 64 and the contactor 88 of the selector switch 60 on to a conductor 89, through the then closed contacts 86 of the limit switch 50 onto a conductor 90 to one side of the coil of the switch 81, and from the other side of the coil to the power line L3 through a conductor 91.

Energization of the coil of the forward switch 81 in this manner effects closure of its two sets of normally open contacts 92 and 93, and opening of its set of normally closed contacts 94.

The energizing circuit for the coil of the high speed switch 84 leads from the power line L1 through a conductor 95 across the contactor 96 of the selector switch 60 on to a conductor 97, through the then closed contacts 85 of the limit switch 49 onto a conductor 98 which leads to one side of the coil of the switch 84, and to the power line L3 from the other side of the coil of the switch 84 through a conductor 99. Energization of the coil of the switch 84 in this manner effects closure of its five normally open sets of contacts 100, 101, 102, 103, and 104.

The spindle motor 10 is now connected with the power lines for high speed forward operation through the closed contacts 92 and 93 of the forward switch 81 which connect the power lines L1 and L3 with two of the high speed motor terminals H through closed contacts 102 and 103 of the high speed switch 84. The power line L2 is connected with the third high speed motor terminal through a conductor 105 leading through the closed contacts 104 of the high speed switch 84.

The spindle motor will continue to operate at forward high speed until the projection of the cam 44 opens the contacts 86 of the limit switch 50 and closes the contacts 107 thereof during continued operation of the cam motor and at the time that a machining operation such as tapping requires reversing of the spindle motor. Upon depression of the actuator of the limit switch 50 by the cam 44 to close the contacts 107 thereof, the energizing circuit for the coil of the forward electromagnetic switch 81 is broken and its contacts opened, and an energizing circuit completed to the coil of the reverse electromagnetic switch 82.

This circuit leads from line L1 through the conductor 68 and the closed contacts 66 of the master relay across the contactor 88 of the selector switch 60 through the then closed contacts 107 onto a conductor 108 leading to one side of the coil of the switch 82, and from the other side of the coil to the power line L3 through a conductor 109.

Energization of the coil of the switch 82 in this manner effects closure of its two sets of normally open contacts 110 and 111, and opening of its set of normally closed contacts 112. Closure of the contacts 110 and 111 thus connects the power lines L1 and L3 to the high speed spindle motor terminals H through the closed contacts 102 and 103 of the high speed switch 84 and the contacts 110 and 111, but in the reverse order to cause the spindle motor to rotate in the opposite direction.

After the projection of the cam 44 has passed the actuator of the limit switch 50, its spring effects opening of the contacts 107 and again closes the contacts 86 thereof so that the spindle motor again operates in a forward high speed direction. Obviously, the cam 44 may be provided with more than one projection to effect more than one reverse of the spindle motor if the machining operations performed by the turret so demand.

Further rotation of the timing cam assembly effects depression of the actuator of the limit switch 49 by the engagement of the projection of the cam 43 therewith. Such actuation of the limit switch 49 causes the contacts 85 thereof to be opened and disrupts the energizing circuit to the coil of the high speed switch 84 permitting its contacts to open.

At this time the coil of the low speed switch 83 is energized through closure of the second set of contacts 113 of the limit switch 49. The circuit for energizing the coil of the low speed switch 83 is from power line L1 through the conductor 95 and the contactor 96 of the selector switch 60 onto the conductor 97 through the then closed contacts 113 of the limit switch 49 onto a conductor 114 to one side of the coil of the switch 83, and from the other side of the coil to the power line L3 through the conductor 99.

Energization of the coil in this manner effects closure of its three sets of contacts 115, 116 and 117, which thereby connect the power lines L1 and L3 with two of the low speed motor terminals L through the closed contacts 92 and 93 of the forward switch 81 and the closed contacts 116 and 117 of the low speed switch 83. Power line L2 is connected with the third of the low speed motor terminals through the conductor 105 and the closed contacts 115 of the switch 83, and through a conductor 118 leading from the switch to the motor. The motor for the spindle will then operate at a low speed in a forward direction in accordance with a particular machining operation to be performed by a tool of the turret.

After the projection of the cam 43 has passed the actuator of the switch 49 the switch again operates to deenergize the low speed switch 83 and cause its contacts to open through opening of the limit switch contacts 113, and operates to re-energize the coil of the high speed switch 84 for high speed operation of the motor.

It will be apparent that the speed of the spindle motor may be changed as often as required by the particular machining operations, by providing the cam 43 with as many projections as necessary.

After the cam motor has effected reciprocation and indexing of the turret to all of its tool stations so that a complete cycle of work has been accomplished by the tools of the turret, the projection 47 of the cycle cam 42 is again aligned with the actuator of the limit switch 45 to open its contacts and effect de-energization of the coil 63 of the master relay 64.

De-energization of the coil of the master relay 64 in this manner effects opening of its contacts 66 which thereupon disconnect lines L1 and L3 from the coil of the cam motor starting switch 70 thereby breaking the circuit to the cam motor, and causes deenergization of the coils of the forward reverse switch 79 allowing the switches 81 and 82 to open.

Closure of the contacts 67 of the master relay 64 in this manner effects energization of the coil of a plugging switch 120 for the cam motor. The coil of the plugging switch 120 is energized by a circuit from line L3 through a conductor 121 and the closed contacts 67 of the master relay, a conductor 122 to one side of the coil of the switch 120, and from the other side of the coil through a conductor 123 and a contactor 124 of the selector switch to a conductor 125 and through a set of closed contacts 126 of a centrifugal switch 127 on the spindle 9 which are closed during forward operation of the spindle motor onto the conductor 95 to power line L1.

Closure of the two sets of contacts 128 and 129 of plugging switch 120 reverses the connection of the power lines L1 and L3 to the cam motor, as is apparent, from the manner in which they were connected when the starting switch 70 was energized. The cam motor is then effectively plugged, and rotation thereof quickly ceases.

Inasmuch as one set of contacts of the limit switch 49 are closed at this time, one or the other of the coils of the high and low speed switch 80 will remain energized to enable plugging of the spindle motor so that the spindle motor will be connected with the lines L1 and L3 for rotation in a direction reverse to its last direction of rotation at the end of the cycle. In this instance the contacts 85 of the limit switch 49 are closed.

Consequently, the coil of the high speed switch 84 will remain energized as the motor has been operating at high speed and in a forward direction closing the centrifugal switch contacts 126 immediately prior to the end of the work cycle.

The plugging of the spindle motor is, therefore, accomplished by an energizing circuit starting at line L1 and continuing through the conductor 95 and the closed contacts 126 of the centrifugal switch onto a conductor 130, through the closed contacts 94 of the open forward switch 81 onto a conductor 131 which leads to one side of the coil of the reverse switch 82, and from the other side of the coil of the switch 82 to the power line L3 through the conductor 109. The spindle motor is then connected with the power lines L1 and L3 for reverse rotation as previously described.

If, however, the last machining operation required that the spindle motor run in a reverse direction, the contacts 132 of the centrifugal switch 127 would be closed at the end of the cycle, and would establish an energizing circuit for the coil of the forward switch 81 from power line L1 through conductor 95 and closed contacts 132 of the centrifugal switch onto a conductor 133 through the closed contacts 112 of the then open reverse switch 82 onto a conductor 134 to one side of the coil of the switch 81 to the power line L3 through the conductor 91.

Energization of the forward switch in this manner would effectively plug the spindle motor if the last machining operation required reverse rotation thereof.

All plugging action for the motors ceases upon loss of speed of the spindle motor to a pre-determined degree at which the contacts 126 or 132 of the centrifugal switch are opened.

The control mechanism has then completed one work cycle for the turret, and has quickly brought the lathe to rest through the plugging action for the cam and spindle motors.

A new cycle may be started after the operator of the lathe has removed the finished work and inserted a new piece into the chuck, and has depressed the start button 61 for a period of time permitting closure of the limit switch 45 by the cycle cam 42.

This initiates a new cycle which is automatically carried to completion after the tools of the turret have each performed their separate operations on the work. It is obvious, therefore, that the major operation of the machine is completely automatic, requiring only the services of an operator for changing the work, and for initiating operation of the control.

During the automatic operation of the machine it is apparent that the operator may attend to another or a plurality of such machines where it is necessary to remove the finished work and insert a new piece into the spindle chuck, and to initiate the automatic operation by depression of the start button.

Such operation as is afforded by this invention does not limit the field from which operators may be drawn, as it is clear that operators of either sex may be used due to the minimum of manual labor required for the operation of the machine. Furthermore, the control of this invention operates in such a manner that unskilled operators may be used.

As stated, however, the automatic operation of the lathe in no way affects manual operation thereof. This results from the particular design of the turret reciprocating mechanism, for it will be seen that the cam follower is engaged with the job cam at one of its depressions at the end of the work cycle. Therefore, the turret may be manually reciprocated without interference from the power reciprocating means, and without disconnecting the same mechanically.

If it is desired to operate the turret lathe manually, the selector switch 60 is thrown to its position illustrated in dotted lines, thus disconnecting all of the limit switches and the cam motor from the control system, and connecting the manual forward-reverse stop and start switch 16 and the manual high and low speed switch 17 into the system.

Thus, to start the lathe in operation, the manual switch 16 is actuated in either direction depending upon whether forward or reverse operation of the spindle motor is required, to connect either the forward or the reverse coil of the switch 79 with the power lines L1 and L3 through the selector switch in an obvious manner. If forward operation of the spindle motor is required, the lever 16 is thrown to energize the coil of the forward switch 81 by a circuit leading from line L3 to one side of the coil by means of a conductor 91, and from the other side of the coil through conductor 90 and the contactor 136 of the switch 16 onto a conductor 137 through the contactor 88 of the switch 60 onto the conductor 68 in the switch and through the contactor 71 of the switch 60 and the conductor 95 to line L1.

The coil of the reverse switch 82 is energized if desired, by a circuit leading from line L3 through conductor 109 to one side of the coil of the switch 82, and from the other side of the coil through the conductors 131 and 108 onto a conductor 139, through the contactor 136 of the manual switch 16 in its reverse position onto the conductor 137 and through the selector switch to the power line L1 through the conductor 95 as previously described.

As stated, the manual switch 17 controls the speed of the spindle motor and operates to connect either the coil of the low-speed switch or the coil of the high speed switch 83 and 84 respectively with the power lines L1 and L3 upon actuation in opposite directions.

The energizing circuit for the coil of the low speed switch 83 beginning with power line L3 follows conductor 99 to one side of the coil of the switch 83, and continues through the coil onto conductor 114 through the contactor 140 of the switch 17 when swung to the left, onto a conductor 141 through the contactor 96 of the selector switch and the conductor 95 to the other power line L1.

If the contactor of the manual switch 17 is thrown in the opposite direction for high speed operation of the motor, the coil of the switch 84 is energized by a circuit leading from line L3 through conductor 99 to one side of the coil of the switch 84, and from the other side of the coil through the conductor 98 and a conductor 142 through the contactor 140 of the switch 17 onto the conductor 141 and through the contactor 96 of the selector switch and the conductor 95 to the other power line L1.

It is obvious, therefore, that the lathe may be operated either manually in the conventional manner or semi-automatically as described.

From the foregoing description taken in connection with the accompanying drawings, it will be readily apparent to those skilled in the art that this invention materially simplifies the operation of a turret lathe of the character described with the result that an operator is necessary only at the start of the work cycle to position a new piece of work into the lathe and to initiate operation of the automatic mechanism.

It is further apparent that labor costs for operating lathes equipped with the devices of this invention are greatly reduced, as one operator may be employed to attend three or four such lathes.

In addition, the control device may be readily applied to any conventional turret lathe, without disrupting manual operation thereof.

What I claim as my invention is:

1. In a turret lathe of the character described having a motor-driven spindle provided with means for clamping work thereto, and having a tool-carrying turret reciprocable toward and from the work carried by the spindle and intermittently rotatable by reciprocation thereof to successively align each of its tools with the work carried by the spindle so that reciprocation of the turret a predetermined number of times effects rotation of the turret through one complete cycle: electric motor-driven means for reciprocating the turret including as an essential part thereof a shaft having a cycle of revolution equal in time to the cycle of revolution of the turret; and means actuated by a part fixed on said shaft for controlling the operation of the spindle motor during the cycle of rotation of the shaft, and for rendering the spindle motor and the electric motor-driven means ineffective at the end of said cycle of rotation.

2. In a lathe of the character described having a reciprocable tool-carrying turret provided with means for rotating the same between each of its tool stations in succession during one complete cycle of rotation and in consequence to recurrent reiprocatory movement thereof in one direction a number of times corresponding to the number of tool stations on the turret: automatic turret reciprocating mechanism comprising a rotatable power-driven member, means for arresting rotation of said member upon rotation thereof through 360°, and means for translating rotation of said member through 360° into recurrent reciprocatory movement of the turret in said direction a number of times sufficient to rotate the turret through one complete cycle.

3. In a lathe of the character described having a stationary frame provided with an electric motor-driven spindle and having a turret slide mounted to reciprocate on said frame and carrying a turret thereon adapted to be intermittently rotated to index the same one step for each complete reciprocation to successively present the tools carried by the turret to work carried by the spindle: means for reciprocating the turret slide, comprising a rotatable shaft, electric motor-driven means for rotating the shaft, means for arresting rotation of said shaft upon rotation thereof through 360°, and a connection between said shaft and the turret slide operable to reciprocate the turret slide a predetermined number of times sufficient to effect rotation of the turret through one complete cycle during rotation of the shaft through 360°; switch means stationary with respect to the shaft and having portions disposed alongside the shaft; and means rotatable with the shaft engageable with said switch means during rotation of the shaft for controlling the operation of the spindle motor.

4. In a lathe of the character described having an electric motor-driven spindle and a reciprocable tool-carrying turret: electric motor-driven means for reciprocating the turret including a rotatable member; electro-responsive means for connecting the spindle motor and the motor of said power-driven means with a source of current; a switch for controlling energization of said electro-responsive means and having an actuator adjacent to the rotatable member movable to open the switch; means on the rotatable member engageable with the actuator of the switch to open the same upon rotation of the rotatable member through 360° and effect deenergization of said electro-responsive means to thereby disconnect the spindle motor and the motor of said power driven means from the source of current; electric control instrumentalities for governing the operation of the spindle motor, said electric control instrumentalities including a pair of switches each having an actuator adjacent to said rotatable member; and means rotatable with said rotatable member for selectively actuating said switches so as to effect a change in the operation of the spindle motor during rotation of the rotatable member in its cycle of rotation.

5. In a machine having a turret normally manually reciprocable between operative and indexing positions for the regular operation of the machine, reciprocation of the turret a predetermined number of times indexing the same through a complete work cycle; electrically controlled means mechanically connected with the turret for imparting such reciprocation thereto including timing mechanism operable to render the electrically controlled means inoperative upon completion of a work cycle by the turret; and a selector switch for rendering said electrically controlled means inoperative to enable manual reciprocation of the turret; said mechanical connection between the turret and the electrically controlled means being such as to permit regular work performing manual operation of the turret without interference from and without mechanically disconnecting the electrically controlled means from the turret.

6. In a machine having a rotatable spindle and a turret reciprocable between operative and retracted positions with respect to the spindle and adapted to be indexed by reciprocation thereof, reciprocation of the turret a predetermined number of times effecting indexing of the turret through a complete work cycle: an electric motor for driving the spindle; means for reciprocating the turret including an electric motor; a plurality of cams driven by the turret reciprocating motor; electromagnetic direction and speed determining switches for the spindle motor; switches controlled by said cams; and control circuits established by said last named switches for effecting energization of the electromagnetic switches so as to coordinate the direction and speed of spindle rotation with the progressive stages of the work cycle.

7. In a machine having a rotatable spindle and a turret reciprocable between operative and retracted positions with respect to the spindle and adapted to be indexed by reciprocation thereof, reciprocation of the turret a predetermined number of times effecting indexing of the turret through all of its tool stations and constituting a complete work cycle: an electric motor for driving the spindle; means for reciprocating the turret including a rotatable power cam shaped to recurrently reciprocate the turret said predetermined number of times which constitutes the work cycle during a single revolution of the power cam, and an electric motor for driving the power cam; timing mechanism rotatable with the power cam so as to be synchronized with respect thereto; electromagnetic direction and speed determining switches for the spindle motor; an electric circuit for each of said electromagnetic switches; and a switch for each of said circuits controlled by said timing mechanism for energizing said electromagnetic switches upon actuation by the timing mechanism for effecting a change in the speed or the direction of rotation of the spindle motor in accordance with various machining operations by the tools of the turret as the turret is indexed to said tool stations through rotation of the power cam.

8. In a machine having a rotatable spindle and a turret reciprocable between operative and retracted positions and adapted to be indexed by reciprocation thereof, reciprocation of the turret a predetermined number of times effecting indexing of the turret through all of its tool stations and constituting a complete work cycle: means for reciprocating the turret including a power cam shaped to recurrently effect reciprocation of the turret said predetermined number of times which constitutes the work cycle during a single revolution of the power cam, and an electric motor drivingly connected with the power cam to rotate the same; an electric motor for driving the spindle; electromagnetic control instrumentalities for regulating the speed of the spindle motor and for governing its direction of rotation; means operable in response to rotation of the power cam to predetermined positions corresponding to certain indexed positions of the turret for effecting energization of the electromagnetic control instrumentalities to coordinate the operation of the spindle motor with the tool stations of the turret; and electric control means operable in consequence to rotation of the power cam through one complete revolution for stopping the cam and spindle motors.

9. In a machine having a rotatable spindle and a turret reciprocable between operative and retracted positions with respect to the spindle and adapted to be indexed by reciprocation thereof, reciprocation of the turret a predetermined number of times effecting indexing of the turret through all of its tool stations and constituting a complete work cycle: an electric motor for driving the spindle; means for reciprocating the turret including a rotatable power cam shaped to recurrently reciprocate the turret said predetermined number of times which constitutes the work cycle during a single revolution of the power cam, and an electric motor for driving the power cam; electric control means for said motors comprising a master relay, an energizing circuit for the master relay, switch means in said circuit for maintaining the master relay energized, an electromagnetic starting switch operable to connect the cam motor with a source of current upon energization of the master relay, a pair of electromagnetic switches for controlling the direction of rotation of the spindle motor, switch means operated in response to rotation of the power cam and in series with the master relay for effecting energization of one or the other of said direction controlling electromagnetic switches for the spindle motor, a pair of electromagnetic switches for controlling the speed of rotation of the spindle motor, a separate energizing circuit for each of said last named switches, other switch means operated in response to rotation of the power cam and operable to complete the energizing circuit to one or the other of said electromagnetic speed controlling switches for the spindle motor, and means rotatable with the power cam for actuating said switch means for the master relay to deenergize the same upon rotation of the power cam to the end of the work cycle so as to disrupt the energizing circuit for the cam motor electromagnetic starting switch and for rendering the spindle motor electromagnetic control switches ineffective.

10. In a machine having a rotatable spindle and a turret reciprocable between operative and retracted positions with respect to the spindle and adapted to be indexed by reciprocation thereof, reciprocation of the turret a predetermined number of times effecting indexing of the turret through all of its tool stations and constituting a complete work cycle: an electric motor for driving the spindle; means for reciprocating the turret including a rotatable power cam shaped to recurrently reciprocate the turret said predetermined number of times which constitutes the work cycle during a single revolution of the power cam, and an electric motor for driving the power cam; electric control means for said motors comprising a master relay, an energizing circuit for the master relay, switch means in said circuit for maintaining the master relay energized, an electromagnetic starting switch operable to connect the cam motor with a source of current upon energization of the master relay, a pair of electromagnetic switches for controlling the direction of rotation of the spindle motor, switch means operated in response to rotation of the power cam and in series with the master relay for effecting energization of one or the other of said direction controlling electromagnetic switches for the spindle motor, a pair of electromagnetic switches for controlling the speed of rotation of the spindle motor, a separate energizing circuit for each of said last named switches, other switch means operated in response to rotation of the power cam and operable to complete the energizing circuit to one or the other of said electromagnetic speed controlling switches for the spindle motor, means rotatable with the power cam for actuating said switch means for the master relay to deenergize the same upon rotation of the power cam to the end of the work cycle so as to disrupt the energizing circuit for the cam motor electromagnetic starting switch and for rendering the spindle motor electromagnetic control switches ineffective; and means under the control of the spindle motor and cooperating with one or the other of said direction controlling electromagnetic switches for establishing a plugging circuit for the spindle motor through one of said electromagnetic direction determining switches so as to quickly stop the spindle motor at the end of the cycle, said last named means being operable to disrupt said plugging circuit upon reduction of the speed of the spindle motor a predetermined degree.

11. In a machine having a rotatable spindle and a turret reciprocable between operative and retracted positions with respect to the spindle and adapted to be indexed by reciprocation thereof, reciprocation of the turret a predetermined number of times effecting indexing of the turret through all of its tool stations and constituting a complete work cycle: an electric motor for driving the spindle; means for reciprocating the turret including a rotatable power cam shaped to recurrently reciprocate the turret said predetermined number of times which constitutes the work cycle during a single revolution of the power cam, and an electric motor for driving the power cam; electric control means for said motors comprising a master relay, an energizing circuit for the master relay, switch means in said circuit for maintaining the master relay energized, an electromagnetic starting switch operable to connect the cam motor with a source of current upon energization of the master relay, a pair of electromagnetic switches for controlling the direction of rotation of the spindle motor, switch means operated in response to rotation of the power cam and in series with the master relay for effecting energization of one or the other of said direction controlling electromagnetic switches for the spindle motor, a pair of electromagnetic switches for controlling the speed of rotation of the spindle motor, a separate energizing circuit for each of said last named switches, other switch means operated in response to rotation of the power cam and operable to complete the energizing circuit to one or the other of said electromagnetic speed controlling switches for the spindle motor, means rotatable with the power cam for actuating said switch means for the master relay to deenergize the same upon rotation of the power cam to the end of the work cycle so as to disrupt the energizing circuit for the cam motor electromagnetic starting switch and for rendering the spindle motor electromagnetic control switches ineffective; means under the control of the spindle motor and cooperating with one or the other of said direction controlling electromagnetic switches for establishing a plugging circuit for the spindle motor through one of said electromagnetic direction determining switches so as to quickly stop the spindle motor at the end of the cycle; said last named means being operable to disrupt said plugging circuit upon reduction of the speed of the spindle motor a predetermined degree; and means also under the control of the spindle motor for establishing a plugging circuit for the cam motor so as to effect quick stopping thereof, the plugging circuit for the cam motor also being disrupted upon reduction of the speed of the spindle motor said predetermined degree.

12. In a machine having a rotatable spindle and a turret reciprocable between operative and retracted positions with respect to the spindle and adapted to be indexed by reciprocation thereof, reciprocation of the turret a predetermined number of times effecting indexing of the turret through a complete work cycle: an electric motor for driving the spindle; means for reciprocating the turret including a rotatable power cam, and an electric motor for driving the power cam; an energizing circuit for the cam motor including switch means for maintaining said energizing circuit closed throughout the work cycle of the turret, and adapted to disrupt said energizing circuit upon rotation of the power cam through one complete revolution; and electromagnetic control instrumentalities rendered operative in consequence to rotation of the power cam for controlling the speed of the spindle motor and for controlling its direction of rotation.

13. In a machine having a rotatable spindle and having a turret reciprocable between operative and retracted positions and adapted to be indexed by reciprocation thereof, reciprocation of the turret a predetermined number of times effecting indexing thereof through all of its tool stations and constituting a complete work cycle: a reversible multi-speed motor for driving the spindle; means for reciprocating the turret including a rotatable power cam shaped to recurrently reciprocate the turret said predetermined number of times which constitutes the work cycle during a single revolution of the power cam, and an electric motor for driving the power cam; a plurality of electromagnetic switches for controlling the speed of the spindle motor; switch means operated in response to rotation of the power cam for rendering said speed controlling electromagnetic switches operative to regulate the speed of the spindle motor in accordance with various machining operations during the work cycle of the power cam; a pair of electromagnetic switches for controling the direction of rotation of the spindle motor, each operable to connect the spindle motor with a source of power for rotation in one direction; an energizing circuit for each of said direction controlling electromagnetic switches including switch means operable in response to rotation of the power cam during its work cycle for completing the energizing circuit to one or the other of said direction controlling electromagnetic switches to thereby enable operation of the spindle motor in opposite directions of rotation in accordance with certain machining operations to be performed by the tools of the turret; electric control means for connecting the cam motor with a source of power at the start of the work cycle including a switch operable to maintain the cam motor in operation in response to rotation of the power cam, said last named switch being operable to disrupt the energizing circuits for said direction controlling electromagnetic switches and to disconnect the cam motor from its power source upon rotation of the power cam to the end of its cycle; another energizing circuit for each of said spindle motor direction controlling electromagnetic switches; and switch means controlled by rotation of the spindle motor in excess of a predetermined speed for completing the energizing circuit to the electromagnetic control switch operable to connect the spindle motor with its power source for rotation in a direction reverse to its direction at the end of the cycle so as to quickly arrest rotation thereof.

14. In a machine having a rotatable spindle and having a turret reciprocable between operative and retracted positions and adapted to be indexed by reciprocation thereof, reciprocation of the turret a predetermined number of times effecting indexing thereof through all of its tool stations and constituting a complete work cycle: a reversible multi-speed motor for driving the spindle; means for reciprocating the turret including a rotatable power cam shaped to recurrently reciprocate the turret said predetermined number of times which constitutes the work cycle during a single revolution of the power cam, and an electric motor for driving the power cam; a plurality of electromagnetic switches for controlling the speed of the spindle motor; switch means operated in response to rotation of the power cam for rendering said speed controlling electromagnetic switches operative to regulate the speed of the spindle motor in accordance with various machining operations during the work cycle of the power cam; a pair of electromagnetic switches for controlling the direction of rotation of the spindle motor, each operable to connect the spindle motor with a source of power for rotation in one direction; an energizing circuit for each of said direction controlling electromagnetic switches including switch means operable in response to rotation of the power cam during its work cycle for completing the energizing circuit to one or the other of said direction controlling electromagnetic switches to thereby enable operation of the spindle motor in opposite directions of rotation in accordance with certain machining operations to be performed by the tools of the turret; electric control means for connecting the cam motor with a source of power at the start of the work cycle including a switch operable to maintain the cam motor in operation in response to rotation of the power cam, said last named switch being operable to disrupt the energizing circuits for said direction controlling electromagnetic switches and to disconnect the cam motor from its power source upon rotation of the power cam to the end of its cycle; another energizing circuit for each of said spindle motor direction controlling electromagnetic switches; switch means controlled by rotation of the spindle motor in excess of a predetermined speed for completing the energizing circuit to the electromagnetic control switch operable to connect the spindle motor with its power source for rotation in a direction reverse to its direction at the end of the cycle so as to quickly arrest rotation thereof; and an electromagnetic plugging switch for the cam motor operable to reverse the connection of the cam motor with its power source in response to operation of said spindle motor controlled switch.

15. In combination with a lathe having a rotatable spindle and a tool holding turret having reciprocatory movement toward and away from said spindle and rotary movement to a predetermined number of stations constituting a work cycle: means for driving the spindle; a revoluble work cam; a motion transmitting member actuated by and under the control of said cam connected with said turret for reciprocating the same; the profile of said cam being such that the turret is reciprocated a number of times corresponding to a work cycle during one complete revolution of the cam and that said motion transmitting member is free to move with respect to the cam at the end of the cycle; means independent of said spindle drive for revolving the work cam; and means operable in timed relation to the revolution of the cam for stopping the latter at the end of a work cycle and in said position at which said motion transmitting member is free to move as required during reciprocation of the turret so that said turret may be reciprocated manually without interference from the cam.

16. In combination with a lathe having a rotatable spindle and a reciprocable slide carrying a tool holding turret rotatable to a predetermined number of stations constituting a work cycle: means for driving the spindle; a revoluble lobe cam; a pivoted lever having an operating connection with said slide and provided with a cam follower riding on said cam, the cam having a profile such that the lever will be rocked on its pivot to effect reciprocation of the slide a number of times corresponding to a work cycle during one complete revolution of the cam; means driven in unison with the cam for effecting cessation of cam revolution at the end of a work cycle and with the cam so positioned that a low portion therein is disposed to receive the cam follower and thereby leave said lever free at the end of a work cycle to move as required during reciprocation of the turret slide so that said slide may be reciprocated manually without interference from the cam and without disrupting the connection between the lever and the slide; and means for manually reciprocating the slide.

17. In combination with a lathe having a rotatable spindle and a tool holding turret reciprocable toward and away from said spindle and rotatable to a predetermined number of stations constituting a work cycle; an electric motor for driving said spindle; manually operable controls for controlling the operation of said motor and the direction and speed of drive thereof; a cam shaft; a work cam secured on said shaft; a member actuated by said cam having connection with said turret for reciprocating the latter, the profile of said cam being such as to effect reciprocation of said turret a number of times corresponding to a work cycle during one complete revolution of said cam and to leave said member free to move as required during reciprocation of the turret at the end of the cycle so that the turret may be reciprocated manually independently of and without interference from said cam; an electric motor for driving said cam shaft independently of said spindle motor; automatic control means comprising control cams on the cam shaft for controlling the speed and direction of drive of said spindle motor conformably to the requirements of the phases of a work cycle and for stopping both of said motors at the end of a work cycle; and means for optionally placing said lathe under control of said automatic means or for disabling said automatic means and rendering said spindle motor controls operative for manual control and operation of the lathe.

18. A machine having a rotatable spindle and having a tool-carrying turret reciprocable toward and from the spindle and adapted to be rotatably indexed upon reciprocatory motion thereof so that reciprocation of the turret a predetermined number of times indexes the turret through a complete cycle of 360: a reversible electric motor for driving the spindle; means for reciprocating the turret comprising, a rotatable member having a lobe cam thereon, an electric motor entirely independent of the spindle motor connected with said rotatable member to drive the same, and a motion transmiting connection between said rotatable member and the turret including a cam follower riding on the lobe cam for translating rotation of said rotatable member through 360° into recurrent reciprocatory movement of the turret a number of times sufficient to effect rotation of the turret through one complete cycle; means moving in timed relation with said rotatable member for arresting rotation of said rotatable member upon rotation thereof through 360°; means for controlling the speed and direction of rotation of the spindle motor; and means on said rotatable member for actuating said spindle motor controlling means so that the speed and direction of the spindle motor is controlled directly by rotation of the same rotatable member that effects reciprocation of the turret.

19. In a machine of the character described: a reciprocable tool carrier normally manually reciprocable between operative work performing and inoperative retracted positions; a power driven lobe cam for providing motion for reciprocating the tool carrier; a connection between said lobe cam and the tool carrier including a cam follower riding on the cam and through which cam produced motion is translated into reciprocation of the tool carrier, said connection being unidirectional so that the tool carrier may be manually reciprocated without necessitating mechanically disconnecting said power means from the turret and without necessitating any mechanical change in the mechanism of the power means whenever the lobe cam is stopped with the cam follower engaging a low point thereof; and means moving with the lobe cam for stopping and holding the lobe cam at a position at which the cam follower engages a low point thereof.

20. In a machine of the class described, the combination of: a spindle member for rotating a piece of work; a tool carrying member; driving mechanism for the spindle member; power means independent of the driving mechanism for said spindle member connected with one of said members for reciprocating the same to effect engagement and disengagement between the work and a tool on the tool carrying member, said power means including a lobe cam, and unidirectional motion transmitting means including a cam follower riding on the lobe cam and connected with the reciprocatory member for translating cam produced motion into reciprocation of said member, said motion transmitting means being movable with respect to and independently of the lobe cam when the cam is stopped and held in a position at which the cam follower is on a low point of the cam to enable manual reciprocation of said reciprocatory member; means rendered operative by the power means for bringing the lobe cam to rest in said position at which such manual reciprocation of the reciprocatory member is possible; manually operable means for effecting reciprocation of said reciprocatory member for the regular performance of work by the machine; and means wholly disassociated from the lobe cam for manually controlling the spindle driving mechanism, so that the machine may be manually operated without any interference from said power means.

21. In a machine of the class described, the combination of: a spindle for rotating a piece of work; a tool carrier movable along a defined path toward and from the spindle; power means including a lobe cam and a cam follower riding on the cam for positively advancing the tool carrier toward the spindle while leaving the carrier free to be retracted by other means; means independent of said power means for retracting the tool carrier; means rendered operative by the power means for automatically stopping the same with the cam follower on a low point of the cam and the tool carrier in its retracted position from which it may be moved manually toward the spindle without interference from said power means; and manually operable means for moving the tool carrier toward the spindle for the regular performance of work by the machine without hindrance from said power means.

22. In a machine of the class described, the combination of: a spindle for rotating a piece of work; a turret adapted for holding a plurality of tools, said turret being mounted on a slide and having rotary movement for aligning the respective tools with the work and the slide being reciprocable to bring the aligned tools into and out of cooperation with the work; manually operable means for reciprocating the turret slide for the regular performance of work; a rotatable work cam having high and low points; a motion transmitting member having a cam follower riding on the work cam and connected to the turret slide for translating one turn of the cam into recurrent reciprocation of the turret a predetermined number of times, said motion transmitting member being movable away from the cam to allow the same to idly follow manually produced reciprocation of the turret slide and thus enable such manual reciprocation of the turret slide unhindered by the cam when the cam is in a position at which the cam follower is on a low point thereof; means for driving the spindle; power means independent of said spindle driving means for driving the work cam; and means operable in timed relation to the rotation of the work cam for stopping and holding the cam in a position at which the cam follower is on a low point of the cam after a predetermined reciprocatory action of said turret slide.

23. In combination with a lathe having a rotatable spindle and a reciprocating slide carrying a tool holding turret rotatable to a predetermined number of stations constituting a work cycle; means for driving said spindle; a revoluble cam having high and low points; means for driving said cam independently of said spindle driving means; means for reciprocating said slide comprising a pivoted lever connected to the slide and having a cam follower riding on the cam to be swung thereby about its pivot, the profile of the cam being such as to effect reciprocation of the slide the proper number of times to complete a work cycle during one complete revolution of the cam; means moving in timed relation with the cam for stopping the same at the end of a work cycle with a low point of the cam engaged by the cam follower so that the lever is free to be swung away from the cam to permit manual reciprocation of said slide independently of the cam; and manually operable means for reciprocating the slide for the regular performance of work.

24. In combination with a machine of the character described wherein work is rotated by a power driven spindle to be acted upon by tools mounted on a normally manually reciprocable tool carrier: an attachment providing a power drive for reciprocating the tool carrier, and comprising; an electric motor; a lobe cam driven by the motor; a force transmitting connection between the tool carrier and the lobe cam including a cam follower riding on the cam and through which the cam acts to reciprocate the tool carrier, said connection being unidirectional so that manual reciprocation of the tool carrier may take place without interference from the power drive whenever the cam is held in a position at which the cam follower is on a low point of the cam; and means driven in timed relation to the motion of the cam for stopping the motor and holding the cam in a position at which the cam follower is on a low point of the cam so that the tool carrier is free for manual reciprocation.

25. In a metal working machine having a rotatable work carrying spindle driven by a reversible multi-speed motor and having a tool carrying turret mounted on a slide normally manually reciprocable toward and from the spindle with the turret adapted to be indexed by such reciprocation to successively present the tools carried thereby to the work carried by the spindle: an attachment for rendering the operation of the machine semi-automatic, said attachment comprising a rotatable lobe cam with its lobes shaped to produce repeated reciprocation of the turret to successively present all of the tools on the turret to the work during one full turn of the cam with each presentation effected in a manner determined by the nature of the work done by the tool presented; a cam follower; a motion transmitting member carrying the cam follower;

means movably mounting the motion transmitting member; means connecting said motion transmitting member to the turret slide so that the cam produced motion thereof is translated into reciprocation of the turret the required number of times during one full turn of the cam; a motor drivingly connected with the cam to rotate the same entirely independent of the spindle; a part driven by said cam driving motor to move a predetermined distance during one full turn of the cam, means cooperating with said part and actuated by the movement thereof for controlling the direction and speed of the spindle motor in accordance with the requirements of the turret tools; means cooperating with said part and actuated by the movement thereof for effecting cessation of spindle and cam rotation after completion of the last machining operation performed on the work by the turret carried tools with the cam held in a position at which a low point thereon is engaged by the cam follower so that the turret slide may be manually reciprocated independently of the cam; and manually operable means for restarting motor driven spindle and cam rotation.

26. In a machine of the class described, in combination: a rotatable spindle for rotating a piece of work; a reciprocal tool carrier; a tool on said carrier; power means for driving said spindle; power means independent of said spindle driving means for reciprocating said tool carrier comprising a lobe cam having high and low points, a cam follower, and a motion transmitting connection between the cam follower and tool carrier, said motion transmitting connection being connected to the tool carrier to idly follow manually produced reciprocation thereof unhindered by the cam when the cam is stationary in a position at which a low point thereof receives the cam follower; means for stopping and holding the cam in such position; and means for manually reciprocating the tool carrier entirely independently of the cam and its power driving means.

27. In a machine of the class described, in combination: means for rotating a piece of work; a tool carrier carrying a plurality of tools and operable to successively align the respective tools with the piece of work; said tool carrier being mounted for movement toward and from the work; power actuated driving means; a unidirectional motion translating connection between said power actuated driving means and the tool carrier for moving the tool carrier toward the work, the unidirectional character of the motion translating connection releasing the tool carrier from said power actuated driving means following each movement of the tool carrier toward the work; means driven in timed relation with said power actuated driving means for stopping and holding the same stationary when the tool carrier is in a position in which it is released from said power actuated driving means; and means for manually moving the tool carrier toward the work entirely independently of said power actuated driving means.

28. In a turret lathe of the character described having an electric motor driven spindle provided with means for clamping work thereto and having a tool carrying turret reciprocable toward and from an operative position presenting the tools carried thereby to the work clamped to the spindle and intermittently angularly movable to successively align each of its tools with the work, a predetermined number of angular movements of the turret carrying the turret through one cycle of rotation to present all of the tools carried thereby to the work: electric motor driven means for reciprocating the turret; a rotatable shaft constituting an essential part of said electric motor driven means and having a cycle of rotation equal in time to the cycle of rotation of the turret; means fixed on said shaft to turn therewith; and switch means actuated by said last named means as it revolves with the shaft for controlling the speed and direction of rotation of the spindle motor during the cycle of rotation of the shaft and for stopping the spindle motor and said electric motor driven turret reciprocating means at the end of the cycle of rotation of the shaft.

EUGENE E. MEUSY.